United States Patent [19]
Connor et al.

[11] Patent Number: 5,933,780
[45] Date of Patent: Aug. 3, 1999

[54] METHOD AND APPARATUS FOR ENHANCED LOGGED SUPERGROUP/ MULTIGROUP CALL RETRIEVAL

[76] Inventors: James M. Connor, 42W016 Hunter's Hill Dr., St. Charles, Ill. 60175; Jeffrey G. Lohrbach, 1108 Duncan Ave., Elgin, Ill. 60120

[21] Appl. No.: 08/804,448

[22] Filed: Feb. 21, 1997

[51] Int. Cl.⁶ .................................................. H04B 17/00
[52] U.S. Cl. .......................................... 455/519; 455/412
[58] Field of Search .................................... 455/518, 519, 455/520, 514, 515, 521, 412

[56] References Cited

U.S. PATENT DOCUMENTS

| | | | |
|---|---|---|---|
| 5,214,790 | 5/1993 | Kozlowski et al. | 455/518 |
| 5,387,905 | 2/1995 | Grube et al. | 455/520 |
| 5,423,061 | 6/1995 | Fumarolo . | |
| 5,530,916 | 6/1996 | Schultz | 455/518 |
| 5,710,978 | 1/1998 | Swift | 455/518 |
| 5,711,011 | 1/1998 | Urs et al. | 455/520 |
| 5,724,648 | 3/1998 | Shaughnessy et al. | 455/519 |

OTHER PUBLICATIONS

"Overcome the Challenges of Monitoring Trunked Radio" by Carl Swift *Communications Magazine*, Jan. 1996, pp. 12–14.

*Primary Examiner*—Edward F. Urban
*Assistant Examiner*—Thuan T. Nguyen
*Attorney, Agent, or Firm*—George C. Pappas; Susan L. Lukasik

[57] ABSTRACT

A digital recorder detrunks calls for logging prior to recording same. This allows retrieving what a radio monitoring a particular talkgroup hears and combines that with the best features of a detrunk-on-playback system, namely the ability to isolate those portions of all the system communications which are desired or specifically excluded. The fluid associations between talkgroup IDs, multigroup IDs, and supergroup IDs are used by the recorder to search for the audio which the user wishes to hear. The retrieval of audio heard by a particular, individual radio is made possible through the incorporation of radio affiliation information into a searchable database. A specified individual radio ID may be tracked with respect to its talkgroup affiliations, during a specified time interval, by an appropriate search algorithm. Those affiliations can, in turn, be further used with the talkgroup/supergroup/multigroup search algorithm to retrieve the audio heard by an individual radio user.

20 Claims, 2 Drawing Sheets

METHOD AND APPARATUS FOR ENHANCED LOGGED SUPERGROUP/MULTIGROUP CALL RETRIEVAL

FIELD OF THE INVENTION

This invention is directed generally to the field of RF (Radio Frequency) communication, and more particularly to call logging systems for monitoring and recording talkgroup conversations in a trunked radio system.

BACKGROUND OF THE INVENTION

Trunked radio systems allow communication units that are functionally related to one another (e.g., separate law enforcement groups such as traffic enforcement, detectives, patrol officers, etc.) to be logically grouped together into associated talkgroups. Talkgroups can also be grouped together to form multigroups (e.g., local and county-wide police departments). As the size and complexity of trunked radio systems have grown, with them have grown the desire by radio users and by the operator/dispatcher for increased multi-communication group capabilities.

U.S. Pat. No. 5,423,061 to Fumarolo et al., commonly assigned to the same assignee as the instant case, discloses various improved ways for enhancing multi-communication group capabilities including allowing a plurality of talkgroups to be selected simultaneously and allowing a dispatch console operator to temporarily merge or regroup talkgroups, with the resulting merged entity defined as a supergroup, prior to a message transmission (as in an emergency situation where talkgroups are merged/regrouped on the fly and as a function of the type of emergency occurrence).

The problem with trunked radio systems is that they cannot be effectively monitored and recorded very easily due to their complexity. During normal operation, each individual radio involved in a talkgroup call receives and detrunks the transmissions in its talkgroup. In this regard, each individual radio listens to the frequency assignment instructions from a controller of the trunked radio system and "follows" transmissions (associated with that talkgroup call) as they move from one frequency to another.

Call loggers, or call log recorders as they are also known, are well known for monitoring and recording such two-way radio voice transmissions in a trunked radio system. Typically, trunked call loggers monitor and record the individual talkgroups on a multi-track or multi-channel recorder, capturing on a tape media for example, the individual transmissions of many different talkgroup calls associated with a particular radio channel.

In early call loggers, the playback of a talkgroup call/conversation involved considerable effort requiring non-automatic assembly of scattered transmissions stored on separate tracks of a tape or the like media, where each track holds the transmissions occurring over a designated channel.

More recently, more novels approaches have been implemented or proposed for improving the playback function of multi-track or multi-channel recorders. One such method is described in an article entitled, "Overcome the Challenges of Monitoring Trunked Radio", by Carl Swift, in Communications Magazine, published January of 1996, pp. 12–14. Swift describes a call logging implementation whereby the audio associated with a given group call is detrunked prior to recording and stored on a designated recorder track, while simultaneously another call from a different group call is also being recorded (in parallel fashion) on a different designated track. Detrunking devices or trunked radios follow the conversations in a pre-set talkgroup, and the subsequent audio is recorded on a designated track of the multi-track recorder.

Multiple trunked radios may be used to do detrunking (prior to recording), but a more common and efficient way to achieve detrunking is with modified dispatch (console) equipment. When using the modified dispatch equipment approach, audio for each talkgroup is placed on separate recorder tracks subsequent to recording. When using the multiple trunked radios approach, the over-the-air audio is captured while another device simultaneously captures the system call data. The call data is recorded simultaneously with the audio, allowing later retrieval of the call audio based on the recorded call data. More conventional call loggers now employ a vox switch which analyzes the information to be recorded and removes certain parts of the information (e.g., periods of silence) prior to recording. This allows for somewhat more efficient use of resources.

Large systems—multi-site systems, in particular—require an economical means of logging trunked audio because such systems generally have high numbers of both repeaters and talkgroups. Presently, a dedicated, predefined track or channel is required for each talkgroup. Given the present state of technology, several recorders may be required. Also, because supergroups typically are non-defined and exist or are setup typically by a console operator for only a short indefinite period, the requirement that tracks are designated to all predefined talkgroups makes intelligent retrieval of supergroup calls, difficult. In Motorola's logger for its SmartZone™ trunking system, for example, supergroup audio is recorded on all tracks corresponding to the talkgroups within the supergroup. Hence, every track associated with a regrouped talkgroup contains the same call audio. This is an inefficient, redundant and expensive way to accomplish regroup call recording.

Typically, when a radio unit affiliates with a particular talkgroup, that radio unit, by extension, automatically gets any predefined multi-group assignments. Multigroups are sometimes also called announcement groups, since they allow a group of talkgroups to be further grouped for the purposes of making generalized transmissions. For example, a first talkgroup A may consist of all police detectives within a given region, a second talkgroup B may consist of all beat police officers in the same region, and a third talkgroup C may consist of all traffic enforcement officers again in the same region. Assuming all three talkgroups commonly belong to a singularly defined multi-group M, when any one of the talkgroup members switches to multi-group M and transmits, all the members of talkgroups A, B and C will be dynamically forced onto appropriate transmit/receive channel(s) during the transmission so as to be able to participate in the multi-group call. When the originator of the multi-group call ends the multigroup transmission, all the members of the multi-group automatically return to a state in which they monitor the talkgroup they were on just before the multi-group switch.

Quite often it is important to playback all transmissions heard on a particular radio, including not only transmissions received while re-affiliating to a new talkgroup (e.g., radio switched from talkgroup A to talkgroup B) but also multi-group M messages or announcements received while affiliated in, for example, talkgroup C or supergroup messages. Previous generation call loggers do not have the capability to playback everything heard by an individual radio unit. While current technology allows monitoring everything heard by users monitoring a particular talkgroup, conventional search algorithms don't allow selective retrieval of specific call types, nor do they support flexible logical combinations of calls, call types, and IDs.

Referring again to the Swift article, it describes a call logging scheme whereby non-detrunked call audio is digitized, compressed and stored along with call data (trunking control channel instructions). During digitizing and compression of the audio, silence is eliminated, and thereafter combined with the call data to form data packets which may then be indexed and stored on a hard disk. To recover a conversation, the user specifies a time window and a talkgroup number, name or individual radio ID. The digital recording device (logger) searches the disk to locate the desired conversations. When they are found, the recorder assembles the individual data packets of the desired conversation and replays them for review.

The Swift article is silent on how undefined talkgroup calls (i.e., multi-groups and supergroups) are handled. The conventional manner of retrieval in the logging industry for systems which detrunk on playback appears to be to specify the supergroup or multigroup ID of the desired calls explicitly rather than to treat the supergroup or multigroup ID as one of several that a talkgroup may dynamically take on over time.

The instant invention treats the ID in use at any one time as a dynamic element which can be used to derive other search parameters and looks at the logging problem as one of "What would a radio monitoring a talkgroup having this ID hear?" rather than, as logging products do today, one of "What calls were made on talkgroups having this ID?" This invention improves upon the state of the logging art by considering these extra, simultaneous-to-the-talkgroup IDs, when deciding what audio to retrieve and play back for the listener.

There is a need for improved system, of the type which detrunks on playback, which allows for more efficient retrieval of supergroup and multigroup call audio and includes enhanced search features for the logging recorder user.

DETAILED DESCRIPTION OF THE PREFERRED EMBODIMENTS

The present invention takes the best features of systems which detrunk prior to recording, namely the ability to retrieve what a radio monitoring a particular talkgroup hears and combines that with the best features of a detrunk-on-playback system, namely the ability to isolate those portions of all the system communications which are desired or specifically excluded. The fluid associations between talkgroup IDs, multigroup IDs, and supergroup IDs are used by the logger to search for the audio which the user wishes to hear. These associations are not used in today's generation of logging equipment.

Additionally, the instant invention defines a method for the retrieval of audio heard by a particular, individual radio. This is made possible through the incorporation of radio affiliation information into a searchable database. A specified individual radio ID may be tracked with respect to its talkgroup affiliations, during a specified time interval, by an appropriate search algorithm. Those affiliations can, in turn, be further used with the talkgroup/supergroup/ multigroup search algorithm to retrieve the audio heard by an individual radio user. Individual IDs are thus treated as a key to other information—such as for example, the talkgroup to which an individual was "tuned"—and used to provide enhanced search functionality to a logging recorder user.

Affiliation information allows the relationships between individual users and the talkgroups to which they are affiliated (monitoring) to be readily identified and appropriately recorded to facilitate retrieval. Given information about the particular talkgroup to which a user has affiliated, the talkgroup, multigroup, and supergroup calls heard by that user can be identified. Such affiliation information is only used to retrieve audio for specific calls made/received using specified IDs. An audio message is an individual Push-to-Talk (PTT) by a console (not shown) or an individual PTT by a radio subscriber unit (not shown). This audio message may be of either a group or individual type. The delineation of beginnings and ends for each message type are discussed in detail below.

Figure 1:
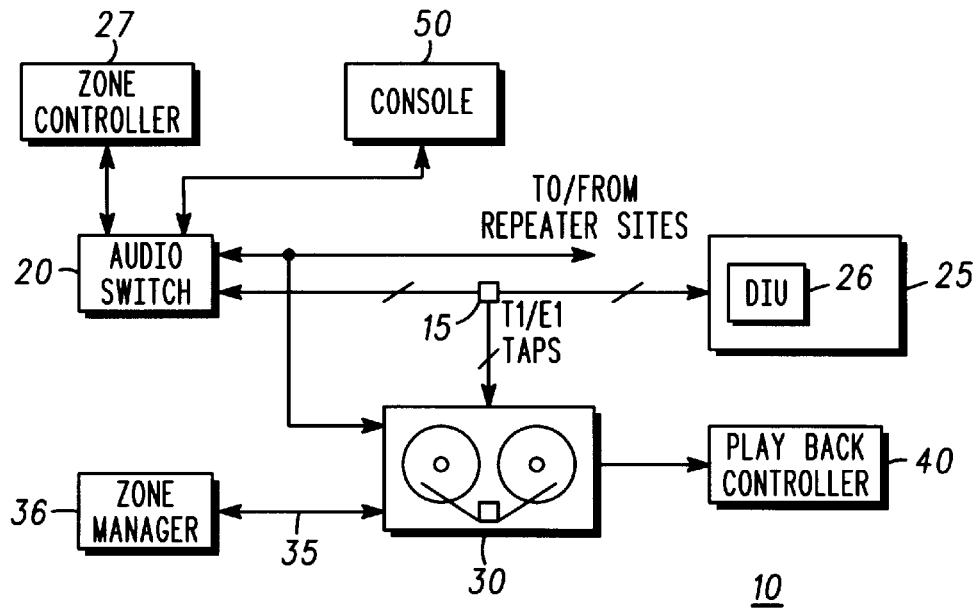
FIG. 1 is a block diagram of a detrunk-on-playback infrastructure based logging system constructed in accordance with the present invention.

Referring to FIG. 1, there is shown a detrunk-on-playback infrastructure based logging system 10 constructed in accordance with the present invention. In logging system 10, during call logging, audio is obtained from infrastructure audio taps 15. In the exemplary embodiment, audio taps 15 are located, as for example in Motorola SmartZone™ systems, at the digital T1/E1 links connecting audio switch equipment 20 to decryption/voice coding equipment 25 by way of digital interface units (DIUs) 26. A Trunking Central Controller (TCC) 27, coupled to the audio switch 20, controls the usage of trunking resources. Audio from taps 15 is fed into a digital logging recorder 30, where the audio is tagged with time information and recorded. A similar "tap" can be used with analog-only calls.

System call data stream information 35 typically monitored by, for example a zone manager 36, is fed into the digital recorder 30 and saved with corresponding time information. In addition to talkgroup ID and individual radio ID information, the call data stream 35 contains information about the infrastructure resources that are involved in each call, thus indirectly identifying the appropriate audio links/ affiliations for that call.

The recorder 30 provides a means to record trunked audio and trunking call control information for later retrieval using a playback controller 40. The playback controller 40 uses a search algorithm to reconstruct individual trunking calls, based upon a group ID or individual ID involved in with a specified call over a specified time interval, and provide the reconstructed call, in analog form, to a listener or analog recorder (not shown). The types of calls which are logged include talkgroup calls, multigroup calls, private calls, interconnect calls, regrouped and non-regrouped patch calls, and regrouped and non-regrouped multi-select calls, described in greater detail below.

The locations chosen to obtain the audio depends upon the cost constraints for the communications system, the logging goals and requirements for the system, and the physical infrastructure, particularly T1 and other leased lines, available for logging call audio.

In a preferred embodiment, the recorder 30 logs each unique audio message as it appears in the system, and is able to later play back a sequence of audio messages based upon the talkgroup ID, the multigroup ID, the supergroup ID, the telephone trunk a phone call is using, the dialed phone number or the Caller ID phone number of a phone call, or one of the individual IDs associated with those messages, as will be explained in greater detail below. These messages may vary in audio mode from system to system, or within the system on a talkgroup or call basis, and the logger must be able to ensure that its output upon playback is analog audio corresponding to the messages it recorded.

Figure 2:
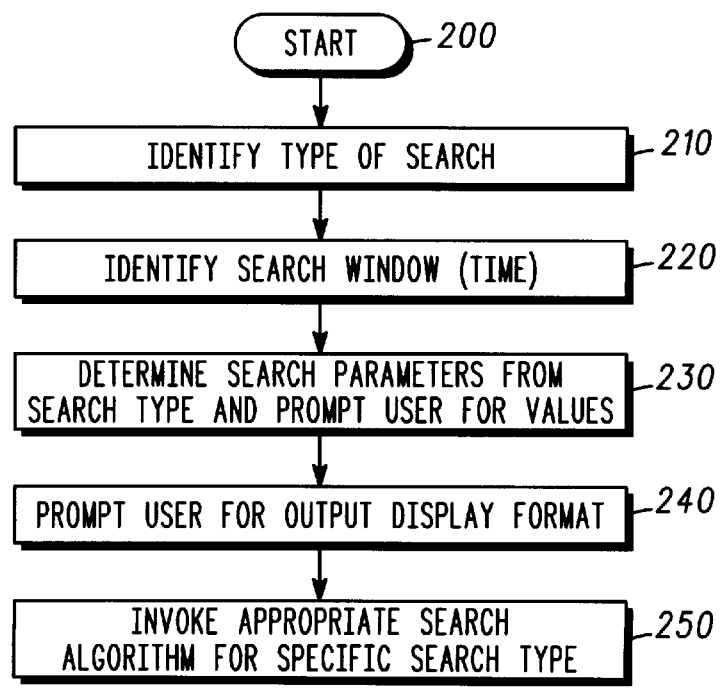
FIG. 2 is a flow chart of the algorithm for prompting the user for inputs necessary to perform a desired playback of logged data.

The search and retrieval algorithm for playback review of talkgroup, multigroup, and supergroup audio will now be described in greater length. The algorithm (search type) using the specified search criteria may reflect searches of varying complexity. Examples of group call search types include, but are not limited to, searches for all calls heard by any radios monitoring a particular talkgroup, searches for only calls of a particular call type (talkgroup, multigroup, or supergroup with the latter algorithm eliminating any talkgroup-only calls sharing the same group ID with the supergroup), and searches for group calls originating from a particular radio. Referring to FIG. 2, the user is asked to identify the type of search (210) and the time frame (search window) of the recorded information sought for retrieval (220). On the basis of these user input parameters, the algorithm determines the appropriate search parameters and prompts (230) the user for additional parameters including output display format (240) and then finally invokes an appropriate search and retrieval routine (250) based on the specified search type. An exemplary search and retrieval routine for playback of all calls heard by radios monitoring a specified talkgroup is shown in FIG. 3, to be described below.

It should be appreciated that the user may alternatively choose to retrieve those calls heard by a particular user. This is accomplished by locating affiliation information captured from the call data stream and stored. This affiliation information is used by the infrastructure to globally identify, by tracking what talkgroup each user is monitoring at each geographic location, those physical base station sites which are to receive call audio for each talkgroup. The algorithm for playback review can use this affiliation information (individual ID, talkgroup ID, and timestamp) to track what talkgroup (and by extension, what multigroup and supergroup) calls were heard by that particular user. With any changes in the talkgroup being monitored by that individual user, the playback algorithm can adjust the search criteria to reflect the new talkgroup. Searching for calls not heard by a particular user involves a similar approach except that the affiliation information for that user is used to eliminate candidate calls.

Figure 3:
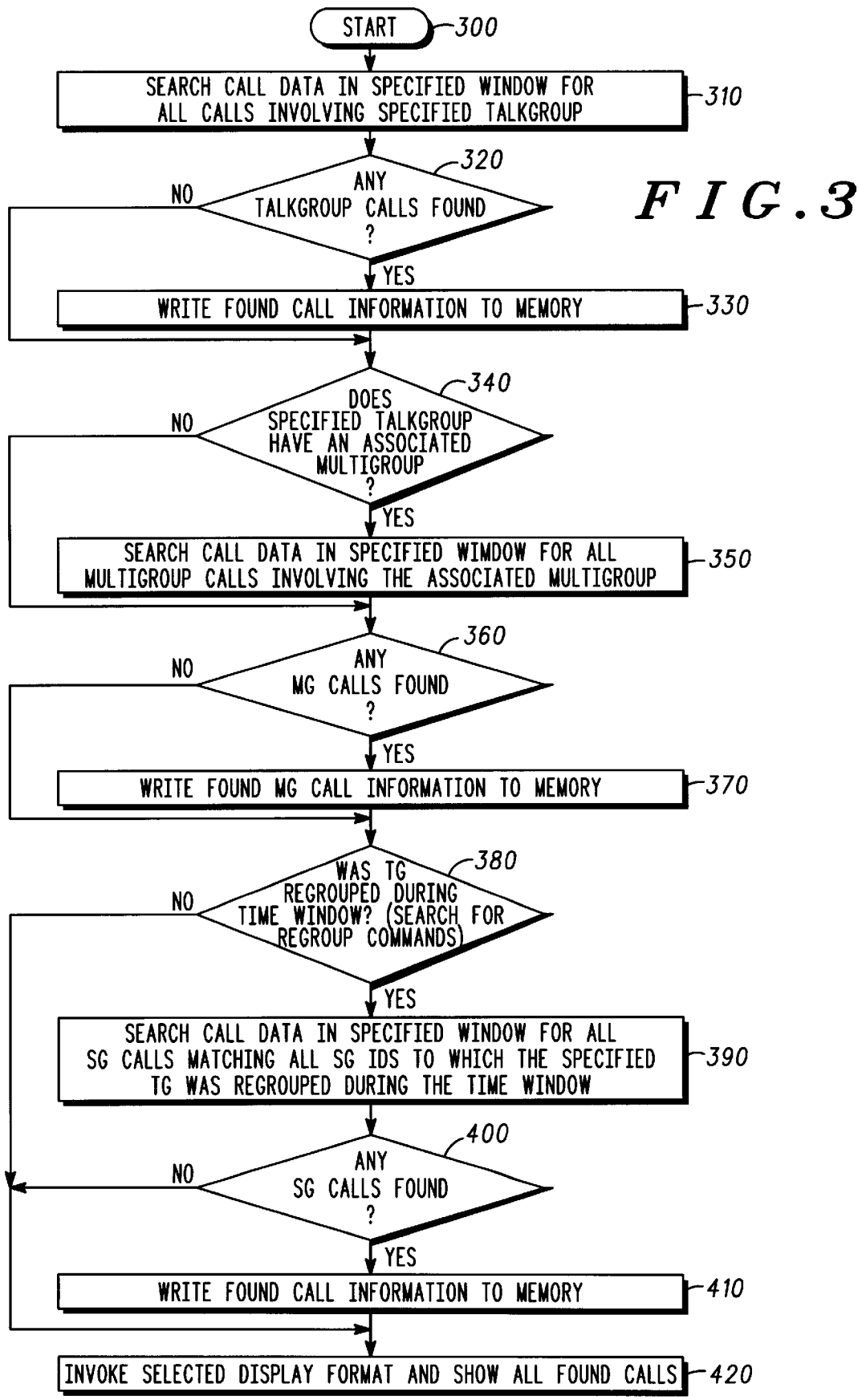
FIG. 3 is a flow chart of an exemplary algorithm for searching and retrieving all calls heard by radios monitoring a specified talkgroup.

Referring to FIG. 3, the search and retrieval routine/algorithm for the most common search type (search for all calls heard by any radios monitoring a particular talkgroup) will now be discussed. During playback, the algorithm searches all call data in the specified window of time for all calls involving a specified talkgroup (310). If any talkgroup calls are found (320), the identified call information is written to memory (330). If the specified talkgroup has an associated multigroup (340), the call data is searched for all multigroup calls involving the associated multigroup for the given window of time (350). If any multigroup calls are found (360), the found multigroup call information is written in memory (370). The algorithm then looks to see if the specified talkgroup was regrouped during the specified window of time. If any regroup commands are identified (380), then the call data is searched for all of the supergroup calls matching all supergroup IDs to which the specified talkgroup was regrouped (390). If any supergroup calls were found (400), then the call information associated with the found supergroup calls are written into memory (410). Finally, the selected display format is invoked and all the found calls shown (420). Audio for the matched calls may be played back to the user after the call audio is located in the storage media using information (such as particular repeater (s) or DIU(s) used for the call. This information, when combined with the time stamp information for the call, maps directly to the stored audio.) contained in the matched and identified call data. The user may choose to play back the found calls in real-time, sequentially, by call type (i.e. all talkgroup calls, all supergroup calls, all multigroup calls), or individually.

A brief description of the available talkgroups now follows. Regrouping is a feature in which talkgroups are temporarily referenced by new talkgroup IDs (the supergroup ID). The same (new) talkgroup ID is assigned to multiple talkgroups to allow them to communicate with one another. In a preferred embodiment, regrouped calls are retrievable based upon either the supergroup ID or the talkgroup ID of any member talkgroups within the patch group. Retrieval by talkgroup ID locates—by the search algorithm in the playback controller 40—both calls involving only that talkgroup and calls in which that talkgroup is a member of a supergroup.

Multigroup, on the other hand, is a feature in which talkgroups are associated with another, separate multigroup ID. Radios monitor traffic associated with their current talkgroup ID setting, and, simultaneously, they monitor the multigroup ID associated with that talkgroup ID. In the preferred embodiment, multigroup calls are retrievable based upon either the multigroup ID or the talkgroup ID of any associated talkgroups in the multigroup. Therefore, retrieval by talkgroup ID locate both calls involving only that talkgroup and calls involving the multigroup to which that talkgroup is associated.

In the exemplary embodiment, audio calls taking place simultaneously within the communications system are logged independently of each other. Ignoring non-radio calls such as telephone calls involving a dispatch console, the maximum number of simultaneously-occurring audio calls is equal to the total number of trunked repeaters (not shown) within the system 10. A dispatch coordinator has the ability, via for example console 50 control, to "take over" an in-progress group call started by a radio subscriber unit. In such a case, the console 50 seizes the repeater output and broadcasts a message to all mobiles and portables while a radio-originated message is still being received by the repeater and heard by the console 50 and any other consoles that may be system coupled. Ideally, both messages shall be logged by the recorder 30. Both messages shall be retrievable based upon the group ID, and if no other filter (such as time or originator ID, for example) is specified, both messages shall be heard simultaneously during that portion of real-time in which they overlap if a real-time output format is selected.

1. Group Call Logging Scenarios and Additional Information

In the exemplary embodiment, single talkgroup calls are delineated by Call Activity Update packets and End of Call packets in the call data stream 35. They are retrievable based upon their talkgroup ID and by the individual ID of the originator.

Within the call data stream 35, the beginning of individual radio and console 50 transmissions are indicated with Group Call Activity Update packets. However, multiple transmissions which occur sequentially and in rapid succession (without exceeding the talkgroup hang time) are grouped into larger constructs known as "calls." The end of a "call," which occurs when a repeater's hang time timer is finally reached, is marked by an End of Call packet. Prior to that time, though, the ends of individual transmissions are not indicated, and the logger must rely on new Group Call Activity Update Packets to delineate individual messages from individual radios and consoles. Additionally, the Call Number field within the Call Activity Update packets remains constant during the logical "call."

Talkgroup calls are indistinguishable from regrouped calls without tracking group/regroup command information from the call data stream 35.

Multiple group messages having identical audio content may occur when a console 50 operator performs simultaneous "instant transmissions." These calls are seen as separate and distinct calls by the communications system, and each requires its own set of system resources. In fact, one message may be discontinued while the other continues. Consequently, these messages should be logged independently. This is a factor if a console microphone path is used as an audio source.

When an active group message loses its repeater(s) because of call preemption by a call of higher priority (such as an emergency call), the message is ended. This appears similar to a normal end of message on the call progress data stream.

2. Multigroup Call Logging Scenarios and Additional Information

Multigroup messages are quite similar to talkgroup messages with one exception: Multigroups are associated with groups of talkgroups on an extended basis and are set-up when the system is initially programmed. All radios tuned to one of a multigroup's associated talkgroups will hear multigroup messages for that multigroup. Therefore, in the preferred embodiment, multigroup calls are retrievable based upon the multigroup ID, any of the multigroup's associated talkgroup IDs, or by the individual ID of the originating radio or console 50.

It is envisioned that a mechanism is provided to enter the multigroup ID/talkgroup ID associations into the trunked logging recorder 30 after they have been initially defined for the system. This may either be a manual entry process or an automatic process in which the associations are retrieved from the Zone Manager 36.

3. Patch Call Logging Scenarios and Additional Information

A patch is set up at a console position when a need is found for multiple talkgroups which normally don't talk amongst themselves to communicate with each other. The talkgroups joined together in a patch are known as members. The patch allows messages from any member talkgroup of the patch to be heard by all radios monitoring any of the member talk groups.

Two types of patches are possible from a console position: regroupable or non-regroupable. Regroupable patches, which utilize a radio feature commonly known as group regrouping (also known as Talkgroup Merge), cause a patch's member talkgroups to temporarily assume a new talkgroup ID, known as the supergroup ID. Radios monitoring a regrouped patch member listen for calls containing the supergroup ID rather than just the talkgroup ID, allowing them to hear any transmission from any radio which is monitoring a patch member talkgroup. The chief advantage of a regrouped patch is that a regrouped patch transmission only requires one repeater at each repeater site in order to be heard by all of the patch member talkgroups (typically up to 40).

At the console, patch members are added sequentially, and the first member added to a regrouped patch group typically, but not necessarily always, becomes the patch supergroup ID. That means that supergroup IDs cannot be known beforehand.

Although the result as heard at the radios does not differ significantly from the regrouped case, non-regrouped patches do differ significantly in the way they are activated and their use of trunked system resources. Non-regroupable patches do not cause the member talkgroups to temporarily assume a new group ID. They retain their usual talkgroup ID.

Instead, a non-regrouped patch message is replicated when the patching console initiates a normal trunked talkgroup call for each member talkgroup. Instead of using one repeater for all talkgroups, the non-regrouped patch requires a repeater for each talkgroup at each site.

A. Non-Regrouped Patch Calls

Each independent talkgroup call which is part of a non-regrouped patch call is delineated by a Call Activity Update packet and an End of Call packet in the call data stream. They are retrievable based upon their talkgroup ID and by the individual ID of the originator. There is no practical way from outside of the fixed infrastructure of the system to determine that these calls are related.

Note that patch group members may be added and removed from a non-regrouped patch during the patch call. This manifests itself as new talkgroup calls being begun on new repeaters or existing calls being ended on repeaters already in use.

As with normal talkgroup calls, an individual talkgroup call comprising part of a non-regrouped patch call may be taken over by a console "instant transmit" operation upon the talkgroup(s). If this happens on a talkgroup receiving and rebroadcasting an inbound radio message, the console message becomes the broadcast audio while the repeater continues to receive the inbound radio message, and both messages should be logged for that talkgroup. The remaining talkgroups are unaffected. If this happens on a talkgroup not receiving an inbound message but only rebroadcasting the patch audio, that talkgroup's repeater will only broadcast the console message, and the console audio is what shall be logged for that talkgroup ID.

As with normal talkgroup calls, an individual talkgroup call comprising part of a non-regrouped patch call may be preempted by a higher priority call. This appears as a normal ending of the call for that repeater, although the other repeaters in the patch call continue broadcasting the patched audio to their respective talkgroups.

B. Regrouped Patch Calls

Regrouping information is available from the call data stream 35 through a Radio Status Traffic packet. This packet indicates CALL_STREAM_START_GROUP_REGROUPING and CALL_STREAM_END_GROUP_REGROUPING for each talkgroup as it is regrouped onto a supergroup ID. These messages may be used to determine which talkgroups belong to which supergroups, and, in turn, used to reconstruct regrouped patch calls on a talkgroup basis.

Because regrouped patch calls only require that a single call be made, each single regrouped patch message is indicated by a single call stream 35 Call Activity Update packet at the call's beginning, and one call stream 35 End of Call packet at the call's end. As with talkgroup calls, additional regrouped patch calls made prior to the repeater hang time will preempt the End of Call packet and, instead, cause a new Call Activity Update packet to be issued. All packets contain the supergroup ID and the same call number.

The chief distinguishing feature of a regrouped patch call is the supergroup ID used in the call's talkgroup field. Because the supergroup ID may vary for any two patch instances containing the same member talkgroups (an instance begins with the request made by the console to the controller to open up a patch group), the recorder 30 is uniquely configured to retrieve a regrouped message by either supergroup ID or by any of the up-to-40 member talkgroup IDs.

The invention allows for new members to be added to regrouped patch groups while patch calls are in progress. This is achieved by providing regrouping commands for the newly added talkgroup. The remaining portion of the call in progress is logged and retrievable for that member talkgroup (determined by matching the regrouping command's supergroup ID with the supergroup ID of the call in progress).

It is further envisioned that, as with the previous calls, a console "instant transmit" may transmit on "top of" an inbound message which is being rebroadcast as a regrouped call. As a console instant transmit only transmits on the particular talkgroup being instant-transmitted upon, that talkgroup will be temporarily removed from the patch and radios monitoring that talkgroup will receive audio from the console. The recorder 30 shall log both audio messages (for the supergroup and for the talkgroup), although only the console audio will be available over-the-air on the repeater's TX frequency, and the retrieved audio for that talkgroup will reflect this.

It is yet further envisioned that it is possible to contain a patch group consisting of both regroupable and non-regroupable talkgroups. When that occurs, the regroupable talkgroups are regrouped onto a single supergroup, which is in turn treated as a member of a non-regroupable patch group. Processing for the entire patch is then as described above for non-regroupable patches.

Regrouped patch calls may be preempted by emergency calls on member talkgroups. If this occurs, the regrouped patch group is usually broken down, the emergency talkgroup removed, a non-regrouped patch formed, and a new non-regrouped patch call begun with the emergency as the audio source. When the emergency call is ended, the regrouped patch group is reformed.

4. Multi-Select Call Logging Scenarios and Additional Information

A multi-select call, sometimes called an announcement call, is just a short-term patch call, and many of the patch considerations shown above remain true for multi-select. However, unlike patch calls, transmissions from radios are not rebroadcast to member talkgroups. Multi-select transmissions are only used for console transmissions which are to be heard by multiple talkgroups. As with patch, talkgroups in the multi-select group are called members.

As with patch, two types of multi-select calls are possible from a console position: regroupable or non-regroupable. Regroupable multi-select calls temporarily regroup the member talkgroups onto a supergroup for only the duration of the console message, and they require only a single repeater at each site. Non-regroupable multi-select calls set up regular talkgroup calls for each of the member talkgroups and, therefore, require a repeater at each site for each member talkgroup.

A. Non-Regrouped Multi-Select Calls

Multi-select (also known as All-Points Bulletin, or APB) calls involving non-regrouped talkgroups are logged for each talkgroup as the message defining the call beginning is received for each member in the Multi-Select group. As with patch, a non-regrouped multi-select call having N members is indistinguishable from N distinct and separate talkgroup calls.

New members may be added to non-regrouped multi-select groups while the multi-select call is in progress. This appears to the external observer as a new talkgroup call containing the talkgroup of the newly-added member. In the preferred embodiment, that portion of the Multi-Select message heard after the new member is added shall be retrievable using the new member's talkgroup ID.

Non-regroupable multi-select calls may involve one or more busy talkgroups at the start of the call. This should be transparent to the logger as the busy talkgroups will not initially be involved in the call. They will appear to be added to the call in progress when they free up, similar to a new member added to a non-regrouped multi-select call.

B. Regrouped Multi-Select Calls

Multi-select and APB calls involving regrouped talkgroups are logged to each member talkgroup after the initial regrouping takes place. A single Call Activity Update packet is received for the call, but because the logger can reliably determine all member talkgroups for multi-select calls (the regrouping occurs just before the transmission), the recorder 30 is preferably made capable of determining all member talkgroups for the call. Therefore, the single call should be retrievable based upon either supergroup ID or by any of the member talkgroup IDs.

New members may be added to regrouped multi-select groups while the multi-select call is in progress. As with patch, this is indicated by the regrouping commands for the newly added talkgroup. The remaining portion of the call in progress may be retrievable for that member talkgroup (determined by matching the regrouping command's supergroup ID with the supergroup ID of the call in progress).

Multi-select calls having both regrouped and non-regrouped members are constructed by regrouping the regroupable members onto a single supergroup and then treating that supergroup as a member of a non-regroupable multi-select group.

When an emergency starts on a talkgroup which is currently a member of a larger supergroup in a regroupable Multi-Select, the audio from the radio initiating the emergency is heard only for the emergency talkgroup while the console's Multi-Select audio is logged for all talkgroups. This occurs because the emergency talkgroup is removed from the supergroup and the Multi-Select continued as a non-regroupable Multi-Select containing a supergroup and a talkgroup. All of this is reflected in the call progress data streams 35, and the recorder 30 must be capable of logging both messages for the emergency talkgroup.

Referring again to the illustrative embodiment, obtaining audio from infrastructure links is less expensive than the control station approach because of the cost of the control stations. It is also a simpler way to record secure/encoded audio because no encryption keys or additional decoding equipment is required; the clear audio is usually available at the infrastructure audio taps. When clear audio is not available, the call can be decrypted and decoded during playback using the call data information.

Moving the detrunking process to playback allows the elimination of the modified dispatch equipment from the system, thereby freeing up backroom equipment space and reducing the cost of the radio switch equipment. Because tracks are only needed on a per DIU/CIU (crypto/voice coder box) basis, the total number of logging tracks is reduced. This reduction would be seen in systems where the number of logged talkgroups exceeds the number of DIU/CIUs or the maximum number of simultaneous multisite analog calls. Also, most of the audio in the system is recorded, so any new talkgroups or individuals will be recorded without reconfiguring the logging equipment.

Being able to reproduce the actual audio heard by a radio system user by interpreting that user's talkgroup affiliation history is most applicable when the specified user is a radio subscriber. This is because radio subscribers must, due to their mobility, affiliate to a particular talkgroup so that the radio system controller can make the most efficient use of the radio system resources (by only sending talkgroup audio to physical repeater sites containing users monitoring those sites). However, the audio heard by fixed radio system users, such as dispatch console positions, may also be searched for and identified as long as those users utilize unique individual ID's for each talkgroup and as long as they also affiliate their individual ID's to talkgroups (much as radio system subscribers do). In this case, the dispatch console affiliation information would also be present in the system call data stream. The procedure and algorithm to search for those calls heard by the dispatch console operator would be identical to those used in searching for calls heard by radio operators except that, for the dispatch console operator, a multiplicity of active talkgroup affiliations are likely to be present simultaneously. The search algorithm cannot assume that only one affiliation is active at a time as is the case for radio subscribers. It must support the case where the console user is monitoring multiple talkgroups (with unique and affiliated Individual ID's) simultaneously. Playback is similar to the radio user case except that the likelihood of encountering, when playing back audio in real-time mode, simultaneous audio messages on the multiplicity of talkgroups being monitored at the same time is great. The portions of messages which overlap in real-time shall be played simultaneously when attempting to recreate what a console user heard.

Although the invention has been described in terms of a preferred embodiment, it will be obvious to those skilled in the art that many modifications and alterations may be made without departing from the invention. Accordingly it is intended that all such modifications and alterations be considered as within the spirit and scope of the invention as defined by the appended claims.

We claim:

1. A method for enhanced logged call retrieval of all calls heard by radios monitoring a specified talkgroup, comprising the steps of:
   searching recorded call data stream for all non-merged talkgroup calls involving a specified talkgroup over specified time interval;
   searching recorded call data stream for dynamic talkgroup merges involving the specified talkgroup over the specified time interval and subsequently searching call data stream for merge talkgroup calls involving those talkgroups which are dynamically merged with the specified talkgroup over the specified time interval;
   identifying those talkgroups which are permanently merged with the specified talkgroup and subsequently searching recorded call data stream over the specified time interval for merge talkgroup calls involving those talkgroups which are permanently merged with the specified talkgroup;
   assembling located calls in sequence; and
   playing back call audio logged by a digital recorder corresponding to the audio detected by all individual radios monitoring said specified talkgroup during said specified time interval, including call audio associated with all corresponding merge talkgroup calls.

2. The method of claim 1, further comprising the step of playing back retrieved call audio one call at a time.

3. The method of claim 1, further comprising the step of playing back retrieved call audio in real time.

4. The method of claim 1, further comprising the step of playing back retrieved call audio individually and sequentially in order of call start.

5. The method of claim 1, wherein said merged talkgroup call is a supergroup call.

6. The method of claim 1, wherein said merged talkgroup call is a multigroup call.

7. The method of claim 1, wherein said merged talkgroup call is a patch call.

8. The method of claim 1, wherein said merged talkgroup call is a multi-select call.

9. A method for enhanced logged call retrieval comprising the steps of:
   searching recorded call data stream for non-merged talkgroup calls involving a specified talkgroup over a specified time interval;
   searching recorded call data stream for dynamic talkgroup merges involving the specified talkgroup over the specified time interval and subsequently searching call data stream for merge talkgroup calls involving those talkgroups which are dynamically merged with the specified talkgroup;
   identifying those talkgroups which are permanently merged with the specified talkgroup and subsequently searching recorded call data stream over the specified time interval for merge talkgroup calls involving those talkgroups which are permanently merged with the specified talkgroup; and
   retrieving at least a portion of the call audio logged by a digital recorder during the specified time interval, said at least a portion including at least one of:
     all audio heard by radios monitoring the specified talkgroup,
     all talkgroup audio heard by radios monitoring the specified talkgroup,
     all multigroup audio heard by radios monitoring the specified talk group,
     all supergroup audio heard by radios monitoring the specified talkgroup,
     all supergroup calls heard by radios monitoring selected talkgroups including the specified talkgroup and at least one other talkgroup, and
     all calls heard by the specified talkgroup but not by any other talkgroups.

10. The method of claim 9, further comprising the step of displaying retrieved call audio for playback in sequential time order.

11. The method of claim 9, further comprising the step of displaying retrieved call audio for playback in groups as a function of call type.

12. The method of claim 9, further comprising the step of playing back retrieved call audio one call at a time.

13. The method of claim 9, further comprising the step of playing back retrieved call audio in real time.

14. The method of claim 9, further comprising the step of playing back retrieved call audio individually and sequentially in order of call start.

15. The method of claim 9, further comprising the step of playing back only calls of a single call type from retrieved call audio.

16. The method of claim 9, wherein said merged talkgroup call is a supergroup call.

17. The method of claim 9, wherein said merged talkgroup call is a multigroup call.

18. The method of claim 9, wherein said merged talkgroup call is a patch call.

19. The method of claim 9, wherein said merged talkgroup call is a multi-select call.

20. A method for enhanced logged call retrieval comprising the steps of:

searching recorded call data stream for the talkgroup affiliation activities of a specified ID of an individual radio over specified time interval;

identifying all of the talkgroup ID's to which a specified ID of an individual radio was affiliated over a specified time interval and subsequently identifying the periods of time within the specified time interval that the individual radio was affiliated to each talkgroup ID;

searching recorded call data stream within each identified period of time for non-merged talkgroup calls involving the talkgroup to which the individual radio was affiliated during that time period;

searching recorded call data stream within each identified period of time for dynamic talkgroup merges involving the specified talkgroup and subsequently searching recorded call data streams for those merged talkgroup calls involving those talkgroups which were dynamically associated with the talkgroup to which the individual radio was associated during that time period;

identifying those talkgroups which are permanently associated with the specified talkgroup and subsequently searching recorded call data stream within each identified period of time for merged talkgroup calls involving those talkgroups which were permanently associated with the talkgroup to which the individual radio was affiliated during that time period; and playing back call audio logged by a digital recorder corresponding to the audio detected by the individual radio during said specified time interval, substantially in the sequence said audio was detected.

* * * * *